(12) United States Patent
Hirabayashi

(10) Patent No.: US 7,532,337 B2
(45) Date of Patent: May 12, 2009

(54) PRINT PROCESSING SYSTEM AND CORRESPONDING METHOD

(75) Inventor: Shinji Hirabayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 945 days.

(21) Appl. No.: 10/951,690

(22) Filed: Sep. 29, 2004

(65) Prior Publication Data

US 2005/0052698 A1   Mar. 10, 2005

Related U.S. Application Data

(63) Continuation of application No. PCT/JP03/04134, filed on Mar. 31, 2003, now abandoned.

(30) Foreign Application Priority Data

Apr. 1, 2002   (JP) .............................. 2002-099134

(51) Int. Cl.
G06F 15/00   (2006.01)
G06F 12/02   (2006.01)
(52) U.S. Cl. ..................................... 358/1.14; 358/1.15
(58) Field of Classification Search ................... 358/1.1, 358/1.8, 1.13, 1.14, 1.15, 1.18, 474, 400, 358/501; 101/2; 700/227; 705/62; 709/201, 709/208, 226
See application file for complete search history.

(56) References Cited

U.S. PATENT DOCUMENTS 6,707,465 B2   3/2004  Yamazaki et al.

2001/0034747 A1*  10/2001  Fujitani et al. ............... 707/525
2002/0002499 A1*   1/2002  Furuya ......................... 705/26
2002/0016775 A1    2/2002  Nakagawa

FOREIGN PATENT DOCUMENTS

| EP | 1 156 486 A2 | 11/2001 |
|---|---|---|
| JP | 11-120740 A | 4/1999 |
| JP | 2000-158761 A | 6/2000 |
| JP | 2001-067408 A | 3/2001 |
| JP | 2001-184184 A | 7/2001 |
| JP | 2001-251430 A | 9/2001 |
| JP | 2001-273111 A | 10/2001 |
| JP | 2002-041819 A | 2/2002 |
| JP | 2002-055801 A | 2/2002 |
| WO | WO 01/16775 A1 | 3/2001 |

* cited by examiner

*Primary Examiner*—Gabriel I Garcia
(74) *Attorney, Agent, or Firm*—Sughrue Mion, PLLC

(57) ABSTRACT

A print processing system of the invention functions to send image data with a time processing program to a mini-laboratory computer at a mini-laboratory that actually executes printing operations. When the time processing program starts, the mini-laboratory computer first determines whether a Print Execute button has been activated to execute printing of currently received image data (step S300). In the case of no click of the Print Execute button, the mini-laboratory computer immediately exits from the time processing program. In response to a click of the Print Execute button, on the other hand, the mini-laboratory computer starts time counting (step S310) and waits until a preset time period in the time processing program elapses (step S320). When the preset time period elapses, the mini-laboratory computer automatically deletes the image data (step S330) and exits from this time processing program.

1 Claim, 5 Drawing Sheets

FIG. 2

Order Page

| Image Selection Input Box | Copy Number Input Box |
|---|---|
|  |  |
|  |  |
|  |  |

Delivery Method ▼

| Name |  |
|---|---|
| Postal Address |  |
| Telephone Number |  |
| E-Mail Address |  |

Order

PRINT PROCESSING SYSTEM AND CORRESPONDING METHOD

CROSS REFERENCE TO RELATED APPLICATION

This is a Continuation of International Application No. PCT/JP03/04134, filed on Mar. 31, 2003, now abandoned.

BACKGROUND ART

1. Field of the Invention

The present invention relates to a print processing system and a corresponding method.

2. Description of the Prior Art

One proposed print processing system enables the user to select either home printing, which prints one or multiple images selected by the user among multiple images via the Internet with the user's own printer, or center printing, which prints the user's selected images with a printer at a printing center and makes delivery of resulting prints to the user (see, for example, Japanese Patent Laid-Open Gazette No. 2002-300146). In response to the user's selection of home printing, this prior art print processing system sends the user's selected images in a size appropriate for the user's own printer and allows the user to edit the selected images in the range of permission of the copyright holder of the selected images and print the edited images with the user's own printer. In response to the user's selection of center printing, on the other hand, the prior art print processing system requests the user to enter specifications of editing and a predetermined size, prints the user's selected images with the entries of the specifications of editing and the predetermined size at the printing center, and delivers resulting prints of the selected images to the user.

In the case where the user selects center printing, the user's selected images are kept in the printing center. This undesirably allows the printing center to freely process the received images and does not effectively prevent illegal printing like unauthorized copies of the images.

The object of the invention is thus to effectively prevent illegal and unauthorized printing of data.

DISCLOSURE OF THE INVENTION

In order to achieve the above object, the present invention is directed to a first print processing system that sends a selected data specified by the user's print request, to a computer of a print operator that actually prints the selected data. The first print processing system includes: a data storage module that stores multiple data; a data reading module that reads the selected data from the data storage module; and a data transmission module that sends the selected data, which is read by the data reading module, to the computer of the print operator in a specific manner that the selected data becomes unavailable after elapse of a preset time period or after printing the selected data at a preset number of times.

The first print processing system of the invention reads the selected data specified by the user's print request from the data storage module and sends the read-out selected data to the computer of the print operator in the specific manner that the selected data becomes unavailable after elapse of the preset time period or after printing the selected data at the preset number of times. The first print processing system of the invention does not allow the print operator to freely print the selected data but restricts printing of the selected data. This print processing system thus effectively prevents the print operator from illegally printing the received data. The start timing of time counting for 'elapse of the preset time period' may be a time point when printing of the selected data starts, a time point when the computer of the print operator receives the selected data, or a time point when the computer of the print operator opens the selected data.

The present invention is also directed to a second print processing system that receives a print request for a print of selected data from a user's computer and sends the selected data to a computer of a print operator that actually prints the selected data. The second print processing system includes: a request receiving module that receives the print request for the print of the selected data from the user's computer; a data storage module that stores multiple data; a data reading module that reads the selected data included in the print request from the data storage module; and a data transmission module that sends the selected data, which is read by the data reading module, to the computer of the print operator in a specific manner that the selected data becomes unavailable after elapse of a preset time period or after printing the selected data at a preset number of times.

The second print processing system of the invention receives the print request for a print of the selected data from the user's computer, reads the selected data from the data storage module, and sends the read-out selected data to the computer of the print operator in the specific manner that the selected data becomes unavailable after elapse of the preset time period or after printing the selected data at the preset number of times. The second print processing system of the invention does not allow the print operator to freely print the selected data but restricts printing of the selected data. This print processing system thus effectively prevents the print operator from illegally printing the received data.

In one preferable embodiment of the second print processing system of the invention, the request receiving module receives delivery-related information with regard to delivery of the print of the selected data, simultaneously with the print request. The data transmission module has a user information transmission module that sends the delivery-related information, simultaneously with the selected data, to the computer of the print operator. The print operator obtains the delivery-related information to deliver resulting prints of the selected data to the user.

In another preferable embodiment of the second print processing system of the invention, the request receiving module receives a print request for a specified number of copies of the selected data from the user's computer. The data transmission module sends the selected data, which is read by the data reading module, to the computer of the print operator in a specific manner that the selected data becomes unavailable after elapse of the preset time period since a start of printing the selected data. Here the preset time period is not less than a time required for printing the specified number of copies of the selected data but is less than a time required for printing a greater number of copies of the selected data, which exceeds the specified number of copies. This arrangement allows the print operator to print the selected data only for the user and thus effectively prevents the print operator from illegally printing the received data. By taking into account potential printing errors, the preset time period may be determined to allow printing of one or plural marginal copies of the selected data, in addition to the specified number of copies.

In still another preferable embodiment of the second print processing system of the invention, the request receiving module receives a print request for a specified number of copies of the selected data from the user's computer. The data transmission module sends the selected data, which is read by the data reading module, to the computer of the print operator in a specific manner that the selected data becomes unavailable after printing the selected data at the preset number of times, which is equivalent to printing the selected data at a number of times corresponding to the specified number of copies. This arrangement allows the print operator to print the selected data only for the user and thus effectively prevents the print operator from illegally printing the received data. By taking into account potential printing errors, the preset number of times may be determined to allow printing of one or plural marginal copies of the selected data, in addition to the specified number of copies.

In one preferable embodiment of the first or the second print processing system, the data transmission module sends the selected data with attachment of a predetermined program that exerts a function of rendering the selected data unavailable after elapse of the preset time period or after printing the selected data at the preset number of times. After elapse of the preset time period or after printing the selected data at the preset number of times, the program is executed to render the selected data unavailable. This arrangement also effectively prevents the print operator from illegally printing the received data.

In one preferable embodiment of the first or the second print processing system of the invention, the data transmission module sends the selected data with attachment of a predetermined program that exerts a function of eliminating the selected data after elapse of the preset time period or after printing the selected data at the preset number of times. After elapse of the preset time period or after printing the selected data at the preset number of times, the program is executed to eliminate the selected data. This arrangement more effectively prevents the print operator from illegally printing the received data.

In the first or the second print processing system of the invention, the selected data may be image data.

The present invention is also directed to a first print processing method that causes one or multiple computers of a print processing system to send selected data specified by a user's print request to a computer of a print operator that actually prints the selected data. The first print processing method causes the computers of the print processing system to attain the steps of: reading the selected data from a data storage module that stores multiple data; and sending the selected data, which is read in the data-reading step, to the computer of the print operator in a specific manner that the selected data becomes unavailable after elapse of a preset time period or after printing the selected data at a preset number of times.

The computer executes the first print processing method of the invention to read the selected data specified by the user's print request from the data storage module and to send the read-out selected data to the computer of the print operator in the specific manner that the selected data becomes unavailable after elapse of the preset time period or after printing the selected data at the preset number of times. The first print processing method of the invention does not allow the print operator to freely print the selected data but restricts printing of the selected data. The first print processing method thus effectively prevents the print operator from illegally printing the received data.

The present invention is also directed to a second print processing method that causes one or multiple computers of a print processing system to receive a print request for a print of selected data from a user's computer and to send the selected data to a computer of a print operator that actually prints the selected data. The second print processing method causes the computers of the print processing system to attain the steps of: receiving the print request for the print of the selected data from the user's computer; reading the selected data included in the print request from a data storage module that stores multiple data; and sending the selected data, which is read in the data-reading step, to the computer of the print operator in a specific manner that the selected data becomes unavailable after elapse of a preset time period or after printing the selected data at a preset number of times.

The computer executes the second print processing method of the invention to read the selected data included in the print request from a data storage module that stores multiple data and to send the read-out selected data to the computer of the print operator in the specific manner that the selected data becomes unavailable after elapse of the preset time period or after printing the selected data at the preset number of times. The second print processing method of the invention also does not allow the print operator to freely print the selected data but restricts printing of the selected data. The second print processing method thus effectively prevents the print operator from illegally printing the received data.

The first or the second print processing method of the invention may be recorded in a computer readable recording medium (for example, a hard disk, a ROM, an FD, a CD, or a DVD), may be transferred from one computer to another computer via a transfer medium (a communication network like the Internet or a LAN), or may be transmitted in any other suitable form.

BRIEF DESCRIPTION OF THE DRAWINGS

FIG. 2 shows an example of an order page;

BEST MODES OF CARRYING OUT THE INVENTION

Figure 1:
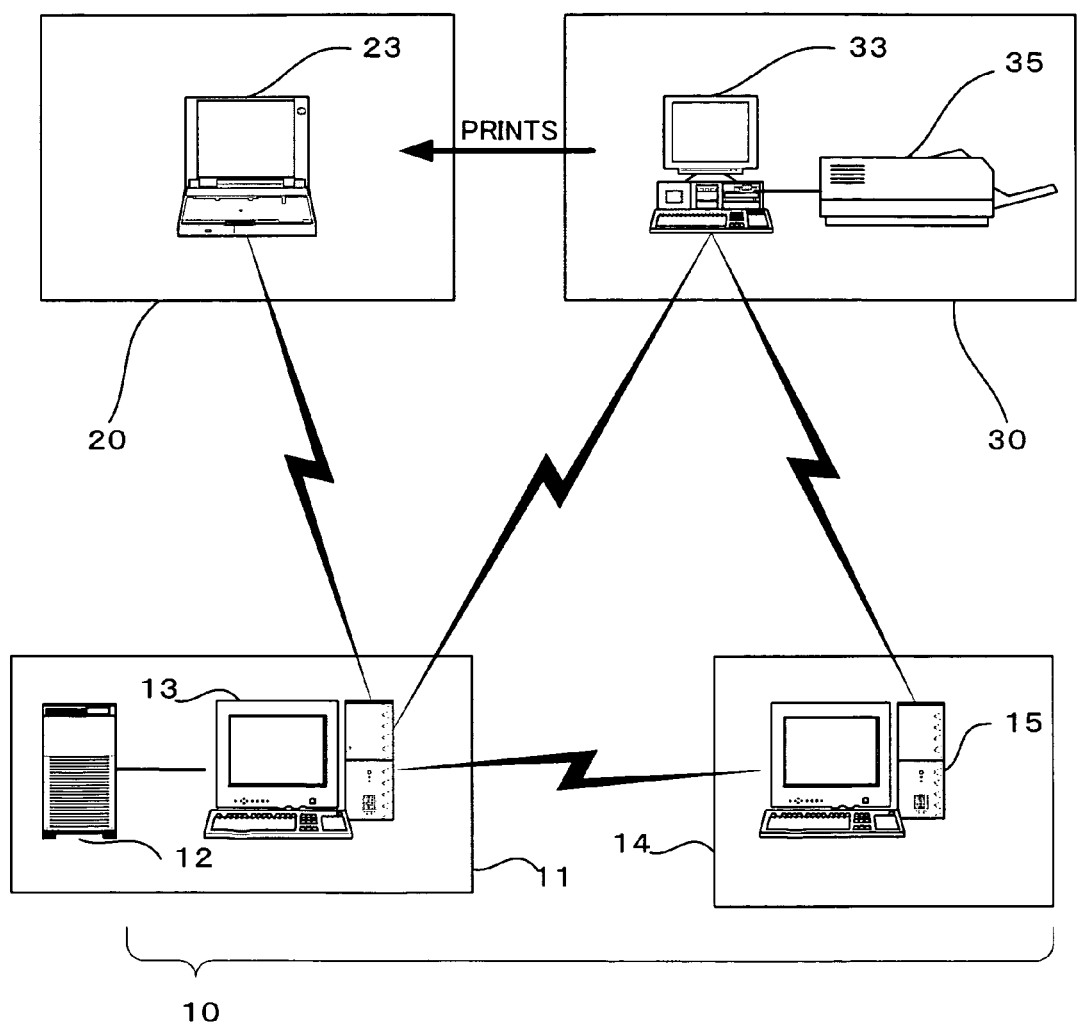
FIG. 1 schematically illustrates the configuration of a print processing system of the embodiment.

One mode of carrying out the invention is discussed below as a preferred embodiment with reference to the accompanied drawings. FIG. 1 schematically illustrates the configuration of a print processing system 10 of the embodiment.

The print processing system 10 includes a Web server 13 installed at a data center 11 and a management server 15 functioning as a backend system 14. The Web server 13 and the management server 15 are interconnected in a communicable manner by an internal network (for example, an intranet or a LAN). The print processing system 10 functions to send object image data to be printed, which is specified by a print request sent from a user computer 23 of each user 20, to a mini-laboratory computer 33 at a mini-laboratory 30 that executes printing operations.

The Web server 13 has a storage device 12 that stores a large number of image data. The Web server 13 is connected with the user computer 23 of each user 20 and with the mini-laboratory computer 33 at the mini-laboratory 30 for executing the printing operations via the Internet. The Web server 13 receives a request from the user computer 23 or the mini-laboratory computer 33 via the Internet and sends back a response in HTML to the request via the Internet to the user computer 23 or the mini-laboratory computer 33. The Web server 13 manages a Web site, which provides high-quality prints of the substantially equivalent quality to silver-salt photographs and receives print orders of selected object image data from the user computer 23.

The management server 15 receives order information and personal information with regard to each user from the Web server 13 via the internal network, and sends the received information in the form of an e-mail to the mini-laboratory computer 33 at the mini-laboratory 30. The management server 15 manages the order information and the personal information with regard to respective users in a database to allow for easy retrieval of required information, for example, information regarding when, which image data, and how many copies each user has ordered. The name, the postal address, the telephone number, and the e-mail address of each user are also stored in the database in an easily searchable manner.

The mini-laboratory computer 33 is connected with a high-resolution business printer 35 for business use by a LAN or the like. The mini-laboratory computer 33 receives the order information and the personal information with regard to a user, which is sent in the form of an e-mail from the management server 15, downloads object image data specified by the user's order information from the Web server 13 via the Internet, and prints the downloaded object image data as high-quality prints with the high-resolution business printer 35. The resulting prints are delivered to the user by a delivery company or any equivalent entity.

The user computer 23 and the mini-laboratory computer 33 are both known general-purpose personal computers. Suitable Web browsers and mailers are installed in the user computer 23 and in the mini-laboratory computer 33 and enable the user 20 and the operator at the mini-laboratory 30 to browse image data on Web pages via the Internet and to receive and send e-mails via the Internet.

The operations of the print processing system 10 are discussed below. The description regards the case where the user 20 purchases prints of selected image data stored in the Web server 13. The user 20 activates the Web browser installed in the user computer 23 to browse image data stored in the storage device 12 at the Web site managed by the Web server 13 and select desired image data for a print request among the browsed image data stored in the storage device 12. According to a concrete procedure, the user 20 receives an order page 50 shown in FIG. 2 from the Web server 13, enters required specifications in the order page 50, and sends the order page 50 with the specified entries to the Web server 13. The order page 50 includes an image display field 51 including display of multiple available image data as thumbnails, an image selection input box 52 to enter one or multiple image names representing selected object image data to be printed by the user's drag and drop operations among the displayed available image data, and a copy number input box 53 to enter a desired number of copies with regard to each of the selected object image data entered in the image selection input box 52. The order page 50 also includes a delivery method input box 54 to select and enter a desired delivery method of resulting prints among options in a pull-down menu, a personal information input box 55 to enter the user's personal information including the name, the postal address, the telephone number, and the e-mail address, and an Order button 56 to be clicked to effect an order with the specified entries. The user enters the required specifications in the respective input boxes 52 through 55 of the order page 50 and clicks the Order button 56. In response to the click of the Order button 56, the user computer 23 sends the information entered in the order page 50 to the Web server 13.

Figure 3:
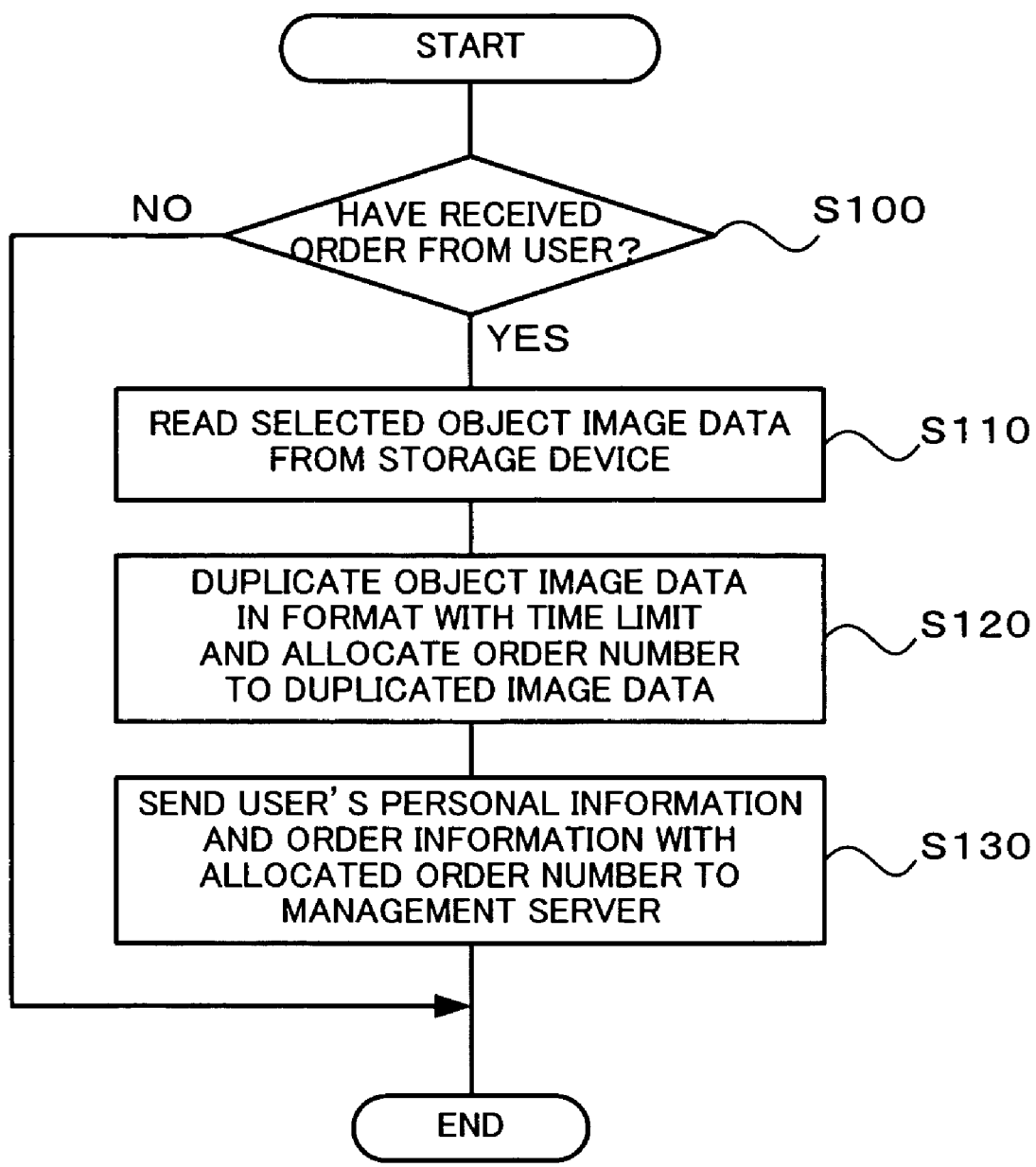
FIG. 3 is a flowchart showing a print request processing program.

The Web server 13 reads and executes a print request processing program from an internal HDD (not shown) at preset timings. FIG. 3 is a flowchart showing the print request processing program. When the print request processing program of FIG. 3 starts, the Web server 13 first determines whether the Web server 13 has just received the order page 50 from the user computer 23 via the Internet, that is, whether the Web server 13 has just received a print request of selected object image data from the user computer 23 (step S100). When not having received any print request, the Web server 13 immediately exits from the print request processing program. When having received the order page 50 from the user computer 23, on the other hand, the Web server 13 reads one or multiple object image data entered in the image selection input box 52 of the order page 50 from the storage device 12 (step S110). The Web server 13 then duplicates the one or multiple object image data read from the storage device 12 to generate an archive file with time limit, allocates an order number to the duplicated image data in the archive file, and stores the archive file with the order number in a predetermined storage area in the storage device 12 (step S120). Here the archive file with time limit has attachment of a time processing program, which causes the computer to eliminate the duplicated image data after elapse of a preset time period since start of execution of printing the selected object image data. The Web server 13 subsequently sends the user's current entries of the order information (for example, the names of selected object image data, the number of copies, and the delivery method) and the personal information (for example, the name, the postal address, the telephone number, and the e-mail address) with the allocated order number to the management server 15 (step S130), before exiting from the print request processing program.

The management server 15 receives the user's order information and personal information with the allocated order number, attaches the received order information and personal information with the order number to an e-mail, and sends the e-mail with the attached information to the mini-laboratory computer 33 at the mini-laboratory 30. The mini-laboratory computer 33 receives the user's order information and personal information with the order number from the management server 15, logs in the Web site of the Web server 13 with an entry of preset ID and password, and requests download of the selected object image data specified by the received order number. When the user's order information includes specification of the mini-laboratory 30, the management server 15 sets the specified mini-laboratory 30 to the destination of the e-mail with the attached information. When the user's order information does not include specification of the mini-laboratory 30, however, the management server 15 sets a mini-laboratory nearest to the postal address of delivery to the destination.

Figure 4:
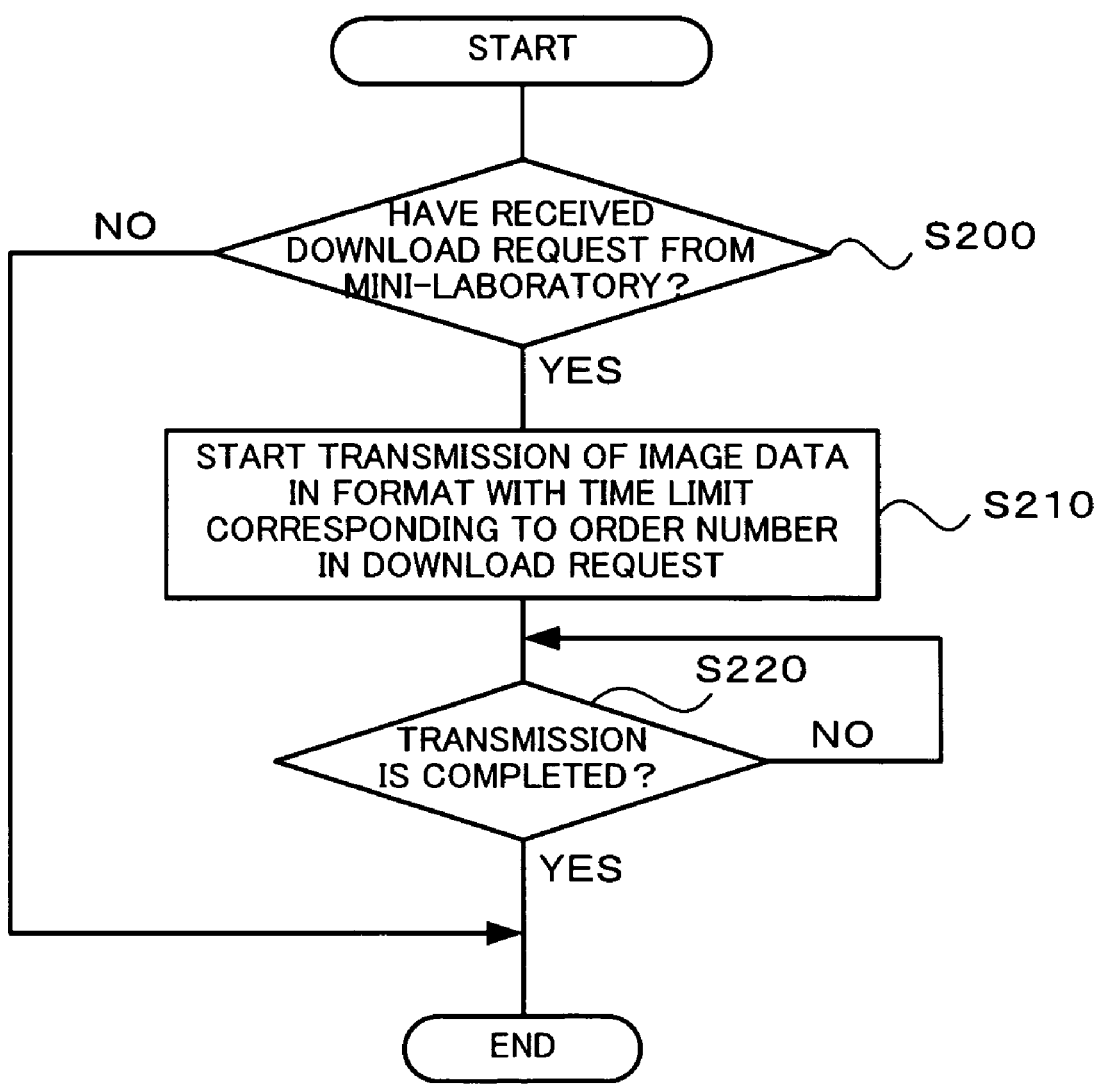
FIG. 4 is a flowchart showing an image data transmission program.

The Web server 13 also reads and executes an image data transmission program from the internal HDD (not shown) at preset timings. FIG. 4 is a flowchart showing the image data transmission program. When the image data transmission program of FIG. 4 starts, the Web server 13 first determines whether the Web server 13 has just received a download request of image data with a preset order number from the mini-laboratory computer 33 via the Internet (step S200). When not having received any download request, the Web server 13 immediately exits from this image data transmission program. When having received a download request, on the other hand, the Web server 13 reads the duplicated image data with attachment of the time processing program corresponding to the preset order number from the predetermined storage area in the storage device 12 and sends the duplicated image data with attachment of the time processing program to the mini-laboratory computer 30 (step S210). The Web server 13 then determines whether the transmission is completed (step S220). In the case of incomplete transmission, the Web server 13 continues the transmission. In the case of complete transmission, on the other hand, the Web server 13 exits from the image data transmission program.

One method applicable by the Web server 13 to make the mini-laboratory computer 33 execute the time processing program incorporates the time processing program as a Java interpreter application (Java is registered trademark of Sun Microsystems Inc.) in a Web page and sends the Web page with the incorporated time processing program to the mini-laboratory computer 33. The mini-laboratory computer 33 downloads the Java application in the process of reading the Web page and executes the Java application.

Another method applicable by the Web server 13 to make the mini-laboratory computer 33 execute the time processing program sends duplicated image data with attachment of the time processing program (see the flowchart of FIG. 5) to the mini-laboratory computer 33. A print control program including the time processing program may be incorporated in a header area of image data like JPEG data and sent to the mini-laboratory computer 33. Alternatively image data may be embedded in a print control program including the time processing program and sent to the mini-laboratory computer 33. In the former structure, the image data is readily separable from the print control program and may thus illegally be stolen. The preferable procedure thus encrypts at least one or both of the image data and the print control program and sends the encrypted image data and print control program to the mini-laboratory computer 33. The latter structure advantageously has difficulties in separation of the image data from the print control program. It is, however, still preferable to send encrypted image data and print control program to the mini-laboratory computer 33. The known common key cryptography or public key cryptograph may be adopted for the encryption. The print control program is one-to-one mapped to the image data. The print control program is called and executed by an application program to print image data after decryption in the case of encrypted image data. The downloaded image data is printable only by this print control program. A modified procedure may incorporate only the time processing program in the header area of the image data or may alternatively embed the image data into the time processing program.

Figure 5:
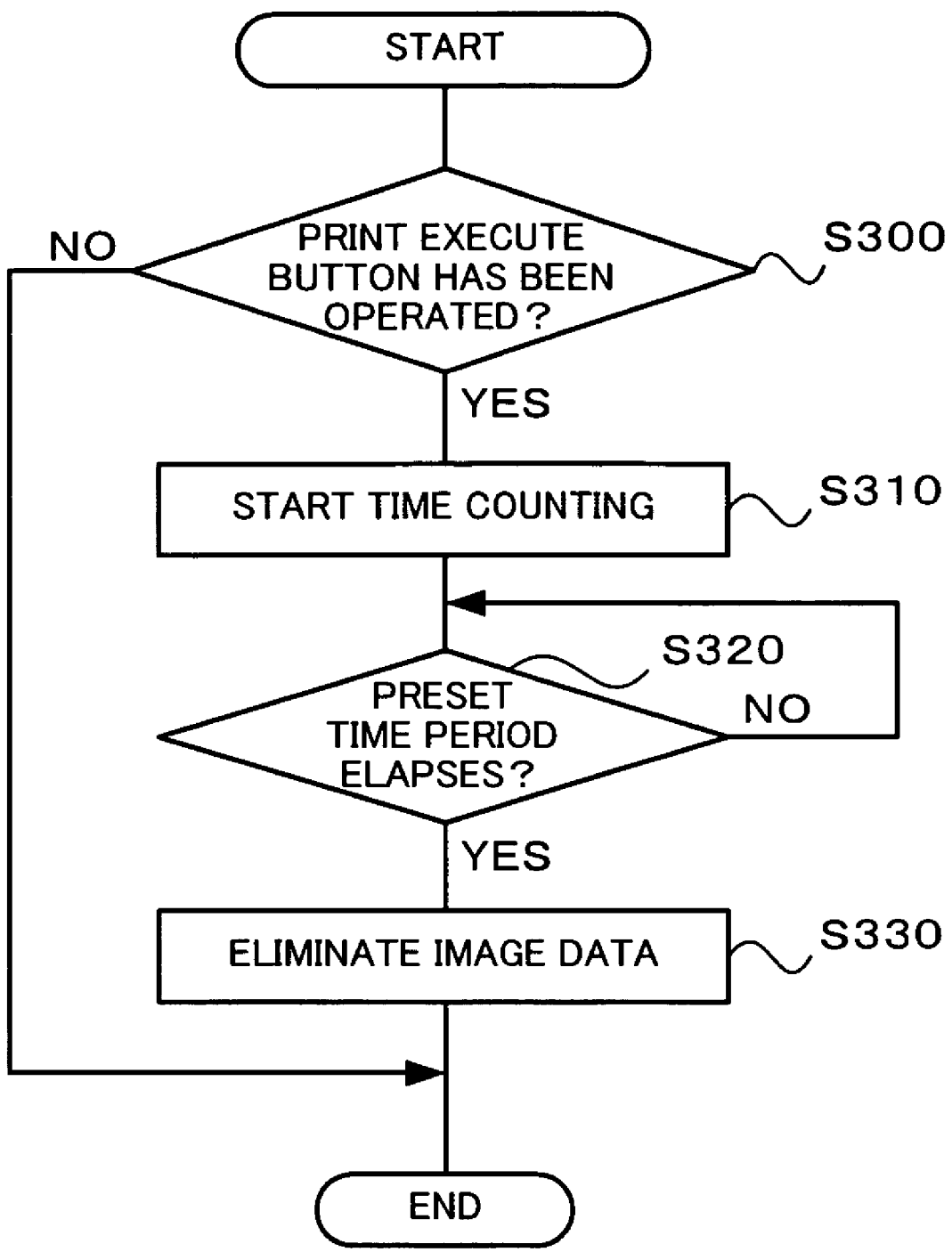
FIG. 5 is a flowchart showing a time processing program.

The mini-laboratory computer 33 receives the duplicated image data with attachment of the time processing program from the Web server 13 and downloads and installs the time processing program in the internal HDD (not shown). The mini-laboratory computer 33 reads and executes the time processing program from the internal HDD at preset timings. FIG. 5 is a flowchart showing the time processing program. When the time processing program of FIG. 5 starts, the mini-laboratory computer 33 first determines whether a Print Execute button has been operated to print one or multiple image data corresponding to the currently received order number (step S300). In the case of no click of the Print Execute button, the mini-laboratory computer 33 immediately exits from the time processing program. In response to a click of the Print Execute button to execute printing of the selected image data, on the other hand, the mini-laboratory computer 33 activates a built-in timer (not shown) to start counting time (step S310) and waits until a preset time period in the time processing program elapses (step S320). When the preset time period elapses, the mini-laboratory computer 33 automatically deletes all the image data corresponding to the currently received order number (step S330) and exits from this time processing program.

The preset time period is determined by the Web server 13 to be not less than a time required for printing a specified number of copies with regard to each of the selected image data corresponding to the currently received order number with the business printer 35 but to be less than a time required for printing a greater number of copies, which exceeds the specified number of copies. On completion of the printing operations for all the image data corresponding to the currently received order number, the mini-laboratory computer 33 has any significant time margin to carry out unauthorized printing of the selected image data and is thus not allowed to print the selected image data over the specified number of copies. After conclusion of the printing operations, the operator at the mini-laboratory 30 makes arrangements to deliver resulting prints of all the image data corresponding to the currently received order number to the user. The operator at the mini-laboratory 30 is informed of the destination of delivery by the user's personal information attached to the e-mail sent from the management server 15.

The storage device 12 at the data center 11 of the embodiment is equivalent to the data storage module of the invention. The Web server 13 of the embodiment corresponds to the request receiving module, the data reading module, and the data transmission module (except the function of sending the delivery-related information) of the invention. The management server 15 of the embodiment corresponds to the function of sending the delivery-related information in the data transmission module.

As described above, in the print processing system 10 of the embodiment, in response to reception of the user's request for prints of selected image data from the user computer 23, the Web server 13 reads the selected image data from the storage device 12, duplicates the read-out selected image data, and sends the duplicated image data to the mini-laboratory computer 33 at the mini-laboratory 30 in a specific manner that the duplicated image data are eliminated after printing a required number of copies. This arrangement does not allow the mini-laboratory 30 to freely print the duplicated image data but restricts printing of the duplicated image data. The arrangement of the print processing system 10 of the embodiment thus effectively prevents the mini-laboratory 30 from illegally printing the duplicated image data sent to the mini-laboratory computer 33.

The Web server 13 receives the delivery-related information with regard to delivery of resulting prints of selected image data (the user's personal information) from the user computer 23 and sends the received delivery-related information to the management server 15. The management server 15 sends the delivery-related information to the mini-laboratory computer 33. The mini-laboratory 30 thus obtains the delivery-related information and takes charge of delivery of resulting prints to the user.

In order to prevent the image data sent to the mini-laboratory computer 33 from being illegally printed over a required number of copies, one possible measure causes the management server 15 to monitor whether the printed number of copies exceeds the required number of copies. This measure may, however, lead to illegal printing by spoofing the management server 15. For example, the third person may spoof the management server 15 to illegally increase the required number of copies or to pretend the printed number of copies has not yet exceeded the required number of copies. The print processing system 10 of the embodiment sends the time processing program to the mini-laboratory computer 33 to monitor whether the printed number of copies exceeds the required number of copies. This arrangement effectively prevents illegal printing by spoofing.

The embodiment discussed above is to be considered in all aspects as illustrative and not restrictive. There may be many modifications, changes, and alterations without departing from the scope or spirit of the main characteristics of the present invention. For example, in the print processing system 10 of the embodiment discussed above, the time processing program attached to the duplicated image data functions to eliminate all the duplicated image data after elapse of the preset time period. The time processing program may alternatively be designed to render the duplicated image data unavailable after elapse of the preset time period, for example, to mosaic process the duplicated image data after elapse of the preset time period.

In the print processing system 10 of the embodiment discussed above, the time processing program functions to eliminate all the duplicated image data after elapse of the preset time period. The time processing program may alternatively be designed to eliminate all the duplicated image data after completion of printing a required number of copies.

In the print processing system 10 of the embodiment discussed above, the management server 15 sends the user's related information to the mini-laboratory computer 33. The Web server 13 may exert the functions of the management server 15, while part of the functions of the Web server 13 may be transferred to another server.

In the print processing system 10 of the embodiment described above, the business printer 35 functions to print out a required number of copies specified by the user's request. The business printer may allow the user to select desired specifications regarding the picture quality and the size of resulting prints in the order page open in response to the user's request and may print out required number of copies satisfying the user's selected specifications.

The print processing system 10 of the embodiment receives the user's request from the user computer 23 via the Internet. The user may alternatively give an order for prints of selected image data to the operator at the data center 11 by telephone. The operator at the data center 11 manually inputs the user's personal information and order information into the Web server 13.

INDUSTRIAL APPLICABILITY

The technique of the invention is applicable to services that appoint a print operator to print selected data specified by a user's print request.

What is claimed is:

1. A print processing system that sends selected image data to a computer of a print operator involved in actually printing the selected image data, in response to reception of a print request of the selected image data from a user's computer, said print processing system comprising:
    a request receiving module that receives a request for printing a specified number of copies of the selected image data from the user's computer;
    a data storage module that stores multiple data;
    a data reading module that reads the selected image data included in the received request from said data storage module; and
    a data transmission module that sends the selected image data, which is read from said data reading module and is embedded in a print control program, to the computer of the print operator, where the print control program is provided in one-to-one correspondence to the selected image data and includes a time limit program designed to prohibit printing of the selected image data after elapse of a preset time period since a start of printing the selected image data, and the preset time period is not less than a time period required for printing the specified number of copies of the selected image data with a printer connected with the computer of the print operator but is less than a time period required for printing any greater number of copies of the selected image data than the specified number.

* * * * *